(12) United States Patent
Liang et al.

(10) Patent No.: US 11,888,338 B2
(45) Date of Patent: Jan. 30, 2024

(54) INDUCTIVE CHARGER APPARATUS WITH MULTIPLE CHARGING PATHS AND METHOD FOR CHARGING THEREWITH

(71) Applicant: Renesas Electronics America Inc., Milpitas, CA (US)

(72) Inventors: Zhigang Liang, Fremont, CA (US); Mehul Shah, Morrisville, NC (US); Sungkeun Lim, Cary, NC (US); Ryan Foran, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/990,240

(22) Filed: Aug. 11, 2020

(65) Prior Publication Data

US 2022/0052534 A1  Feb. 17, 2022

(51) Int. Cl.
 *H02J 7/00* (2006.01)

(52) U.S. Cl.
 CPC ........... *H02J 7/007* (2013.01); *H02J 7/00712* (2020.01); *H02J 2207/20* (2020.01); *H02J 2207/40* (2020.01)

(58) Field of Classification Search
 CPC .... H02J 7/007; H02J 7/00711; H02J 7/00712; H02J 7/007182; H02J 7/0013; H02J 2207/20; H02J 2207/40
 USPC .......................... 320/108, 137, 138, 140, 163
 See application file for complete search history.

(56) References Cited

U.S. PATENT DOCUMENTS

| | | | |
|---|---|---|---|
| 2014/0009120 A1* | 1/2014 | Kim | H02J 7/0068 320/138 |
| 2017/0033581 A1* | 2/2017 | Horii | H02J 50/10 |
| 2017/0133862 A1* | 5/2017 | Jung | H02J 7/00 |
| 2018/0102663 A1* | 4/2018 | Jung | H02J 7/007 |
| 2019/0341796 A1* | 11/2019 | Gu | H02M 3/33584 |
| 2020/0119581 A1* | 4/2020 | Kim | H02J 50/10 |
| 2021/0265842 A1* | 8/2021 | Chen | H02J 7/0048 |

* cited by examiner

*Primary Examiner* — Edward Tso
*Assistant Examiner* — Aaron Piggush
(74) *Attorney, Agent, or Firm* — Foley & Lardner LLP (57) ABSTRACT

Exemplary embodiments may include a device with an input power component, a system supply component, an inductive charger component operatively coupled to the input component and the system component, and a direct charger component operatively coupled to the inductive charger and the system component. Exemplary embodiments may further include an input node of the inductive charger component and an input node of the direct charger component operatively coupled to an output node of the input power component at a first device node. Exemplary embodiments may also include a method of receiving an input power signal, obtaining a charging condition, entering a first charging state, in accordance with the obtained charging condition satisfying a first charging condition, and entering a second charging state, in accordance with the obtained charging condition satisfying a second charging condition.

10 Claims, 11 Drawing Sheets

INDUCTIVE CHARGER APPARATUS WITH MULTIPLE CHARGING PATHS AND METHOD FOR CHARGING THEREWITH

TECHNICAL FIELD

The present embodiments relate generally to electrical power supplies, and more particularly to an inductive charger apparatus with multiple charging paths and a method for charging therewith.

BACKGROUND

Mobile electronic devices are increasingly ubiquitous in many individual and interpersonal activities. In addition, mobile electronic devices are increasingly exposed to extended use without access to charging infrastructure, or with access to charging infrastructure for limited periods of time. In parallel, mobile technology platforms increasingly incorporate uniform power delivery systems based on commonly agreed-upon power characteristics. Conventional systems, however, do not incorporate such uniform power delivery systems into high-speed and highly reliable battery charging for mobile electronic devices. Thus, there exists a need to provide high-speed and highly reliable battery charging for electrical and electronic devices, while maintaining or reducing components and devices for implementing high-speed and highly reliable battery charging.

SUMMARY

Exemplary embodiments may include a device with an input power component, a system supply component, an inductive charger component operatively coupled to the input component and the system component, and a direct charger component operatively coupled to the inductive charger and the system component. Exemplary embodiments may further include an input node of the inductive charger component and an input node of the direct charger component operatively coupled to an output node of the input power component at a first device node. Exemplary embodiments may also include a method of receiving an input power signal, obtaining a charging condition, entering a first charging state, in accordance with the obtained charging condition satisfying a first charging condition, and entering a second charging state, in accordance with the obtained charging condition satisfying a second charging condition.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Exemplary embodiments in accordance with present embodiments include a direct charging path for existing battery chargers allowing a user of a mobile device to implement direct charging to charge a battery quickly. Exemplary embodiments in accordance with present embodiments supply direct charging with a power path selector capable of also providing input power through an inductive charger, in order to minimize the number, complexity, and cost of components and materials to implement exemplary embodiments.

Figure 1:
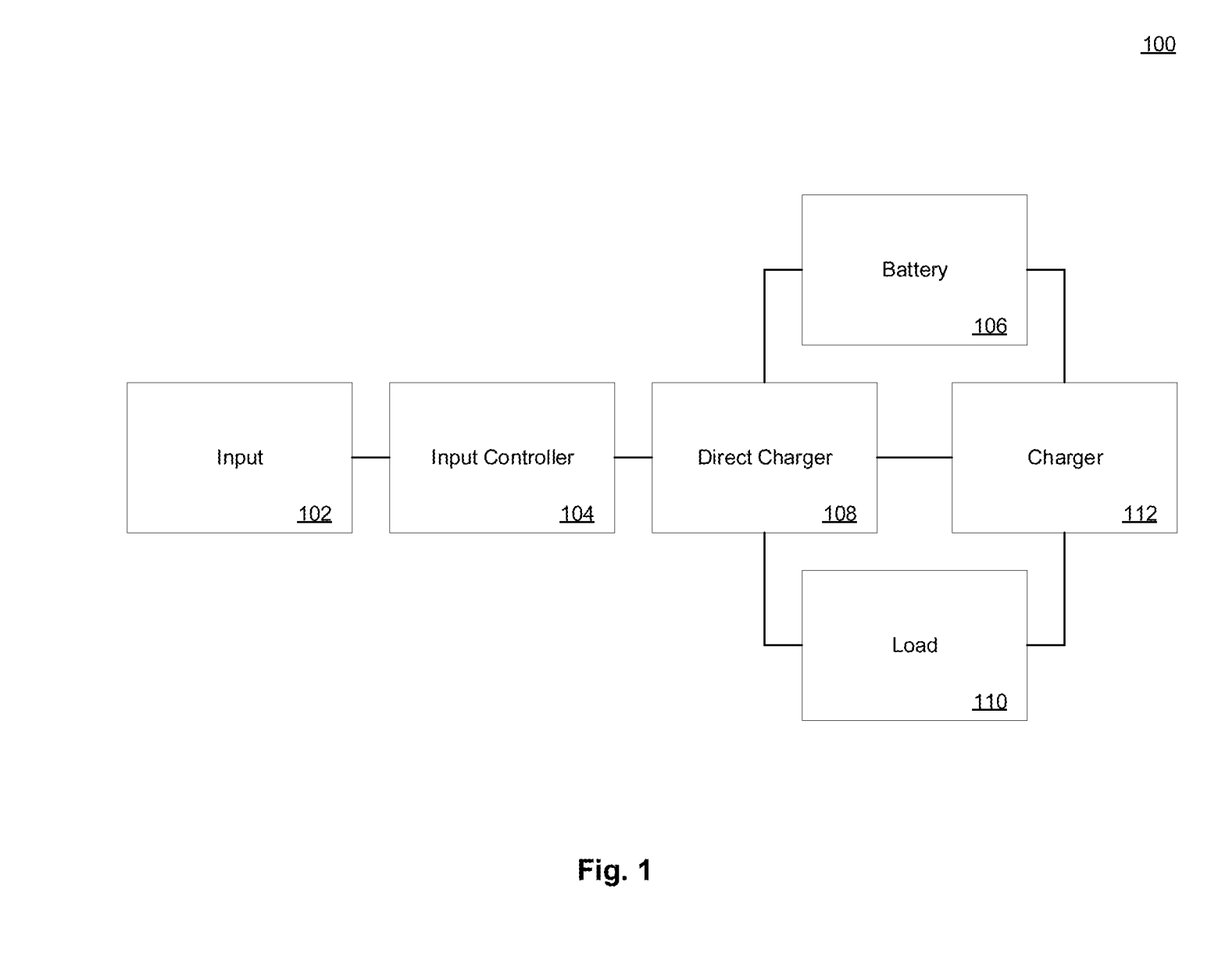
FIG. 1 illustrates an exemplary system in accordance with present embodiments.

FIG. 1 illustrates an exemplary system in accordance with present embodiments. As illustrated in FIG. 1, an exemplary system 100 includes an input 102, an input controller 104, a battery 106, a direct charger 108, a load 110, and a charger 112.

The input 102 may comprise a source of electrical power, voltage, current, or the like for supplying power to the system 100. In some embodiments, the input 102 includes, but is not limited to regulated 120 V AC power, regulated 220V AC power, 5V DC power, 12V DC power, or the like. In some embodiments, the input 102 may comprise a wired power connection, a wireless direct contact power connection, a wireless and contactless power connection, the like, or any power connection as is known or may become known. In some embodiments, the input 102 comprises one or more USB terminals or ports (e.g., USB-C, USB-PD).

The input controller 104 may comprise one or more electrical, electronic, electromechanical, electrochemical, or like devices or systems for controlling transmission of power, voltage, current, or the like from the input 102 to one or more of the battery 106, the direct charger 108, the load 110, and the charger 112. In some embodiments, the input controller 104 comprises one or more port controller logic devices for controlling transmission of power, voltage, current, or the like from the input 102 in accordance with one or more power or interconnect conventions, processes, guidelines, or standards. As one example, the input controller 104 may be operable in accordance with any USB standard or convention. As another example, the input controller 104 may be operable according to any USB-C and USB-PD standard or convention.

The battery 106 may comprise one or more electrical, electronic, electromechanical, electrochemical, or like devices or systems for at least one of receiving, storing and distributing input power. In some embodiments, the battery 106 comprises one or more stacks of batteries. In some embodiments, the battery 106 comprises lithium-ion or like energy storage. In some embodiments, the battery 106 is integrated with, integrable with, or separable from the system 100. In some embodiments, the battery 106 includes a plurality of battery units variously or entirely integrated with, integrable with, or separable from the system 100.

The direct charger 108 may comprise one or more electrical, electronic, electromechanical, electrochemical, or like devices or systems for at least one of coupling the input 102 to the battery 106, isolating the input 102 from the load 110, isolating the charger 112 from the load 104, and isolating the battery 106 from the load 104. In some embodiments, the direct charger 108 is operable to switch the system 100 into a "rapid charge while off" mode in which all or substantially all input power from the input 102 is directed to the battery 106 and isolated from the load 104. In some embodiments, the direct charger 108 is operable to determine whether input power from the input 102 satisfies parameters of the battery 106 or is otherwise compatible with the battery 106. In some embodiments, the direct charger is coupled to external logic operable to determine whether input power from the input 102 satisfies parameters of the battery 106 or is otherwise compatible with the battery 106.

The load 104 may comprise one or more electrical, electronic, electromechanical, electrochemical, or like devices or systems for receiving power, voltage, current, or the like from the charger 116 to perform one or more actions. In some embodiments, the load includes at least one battery, electronic display, electronic computer, electronic input device, electromechanical input device, electronic output device, electromechanical output device or the like. Examples of these devices include notebook computers, desktop computers, tablets, smartphones, printers, scanners, telephony endpoints, videoconferencing endpoints, keyboards, mice, trackpads, gaming peripherals, monitors, televisions, and the like. In some embodiments, the load 104 comprises one or more devices that are partially or fully separable from the system 100. In some embodiments, the load 104 comprises one or more devices that are partially or fully integrated or integrable into, or separable from, the system 100.

The charger 116 may comprise one or more one or more electrical, electronic, electromechanical, electrochemical, or like devices or systems for charging or discharging the load 104. In some embodiments, the charger may comprise an inductive charger. An inductive charger may be, but is not limited to, a buck charger, a boost charger, a buck-boost charger, a combination thereof, or the like.

FIGS. 2A, 2B, 3A, 3B, 4A, 4B, 5A and 5B respectively illustrate exemplary systems 200A, 200B, 300A, 300B, 400A, 400B, 500A and 500B, each variously including either a buck-boost charger or a buck charger, and including a direct charging path. For explanatory purposes only, elements of the above-noted figures referenced herein, by number only, refer to all exemplary elements sharing the corresponding reference number. In some embodiments, the exemplary system 200, 300, 400 or 500 may comprise one or more discrete electrical, electronic, or like elements assembled on a printed circuit board, a solderless circuit board (e.g., a "breadboard") or the like. In some embodiments, one or more elements of the exemplary system 200, 300, 400 or 500 may be fabricated in an integrated circuit or multiple integrated circuits assembled on a printed circuit board, a solderless circuit board, or the like. In some embodiments, one or more portions or components of the exemplary system 200, 300, 400 or 500 may be implemented in one or more programmable or reprogrammable devices or systems.

The system 200 may comprise an input portion 210, an input controller portion 220, a direct charging portion 230, a charging portion 240, a battery portion 260, and an output portion 270. The system 200, 300, 400 and 500 may further respectively include a system capacitor 228, 328, 428 or 528. In some embodiments, one or more of the input controller portion 220, the direct charging portion 230, and the charging portion 240 include or are coupled to one or more logic devices operable to activate and deactivate the transistors therein. While various devices may be described as embodied by way of example as power MOSFETs, it is to be understood that exemplary systems in accordance with the present embodiments may include one or more transistors of various types in addition to or instead of power MOSFETs. Exemplary transistors of various types include, but are not limited to, FETs, MOSFETs, IGBTs, and BJTs as are known or may become known.

The input portion 210 may comprise input terminals 212 and 214 for receiving input power from an external device, system, or the like. In some embodiments, the input terminals 212 and 214 comprise terminals couplable with wired or wireless power interfaces, cables, connectors, adapters, or the like. In some embodiments, at least one of the input node 212 and 214 comprise one or more USB terminals or ports (e.g., USB-C, USB-PD). In some embodiments, input power comprises at least one fixed, alternating, variable, or like voltage, current, capacitance, inductance, flux, or the like as is known or may become known. The input portions 310, 410 and 510 may correspond to the input portion 210. Further, the input terminals 312, 412 and 512 and the input terminals 314, 414 and 514 may respectively correspond to the input terminals 212 and 214.

The input controller portion 220 may comprise one or more control devices or elements for controllably activating and deactivating a connection between the input terminal portion 210 and one or more portions of the system 200, including one or more of the direct charging portion 230 and the charging portion 240. In some embodiments, the input controller portion 220 comprises a first input controller including input controller transistors 222 and 224 controlling input power received from input terminal 212. In some embodiments, the input controller transistors 222 and 224 comprise power MOSFETs arranged serially with respective body diode anodes oriented toward a common node. In some embodiments, this arrangement minimizes leakage at least of voltage, current, or the like in a disconnected state electrically isolating the input terminal 212 from at least the direct charging portion 230 and the charging portion 240. In some embodiments, the input controller portion 220 comprises a second input controller including an input controller transistor 226 controlling input power received from input terminal 214. In some embodiments, the input controller transistor 226 comprises a power MOSFET. In some embodiments, gate terminals of one or more of the input controller transistors are coupled to one or more input control logic devices for switch activation and deactivation. The input controller portions 320, 420 and 520 may correspond to the input controller portion 220. Further, the input controller transistors 222, 224 and 226 may respectively correspond to input controller transistors 322, 422 and 522, input controller transistors 324, 424 and 524, and input controller transistors 326, 426 and 526.

The output portion 270 may comprise an output node 272 for supplying an output voltage. In some embodiments, the output node 272 comprises a wired connection interface for supplying output power in accordance with the load 110. In some embodiments, the output node 272 comprises terminals couplable with wired or wireless power interfaces, cables, connectors, adapters, or the like. In some embodiments, the output node comprises connection interface to a commonly integrated, commonly integrable, or separable electrical, electronic, or like device or system. In some embodiments, the output node 272 comprises one or more USB terminals or ports (e.g., USB-C, USB-PD). In some embodiments, output power comprises at least one fixed, alternating, variable, or like voltage, current, capacitance, inductance, flux, or the like as is known or may become known. The output portions 370, 470 and 570 may correspond to the output portion 270. Further, the output nodes 372, 472 and 572 may correspond to the output terminal 270.

The direct charging portion 230 may comprise one or more control devices or elements for controllably activating and deactivating a connection between the input terminal portion 210 and one or more portions of the system 200, including one or more of the charging portion 240, the battery portion 260, and the output portion 270. In some embodiments, the direct charging portion 230 comprises direct input control transistors 232 and 234 controlling input power received from the input controller portion 220. In some embodiments, the direct input control transistors 232 and 234 comprise power MOSFETs arranged serially with respective body diode cathodes oriented toward a common node. In some embodiments, this arrangement minimizes leakage at least of voltage, current, or the like in a disconnected state electrically isolating the input controller portion 220 from at least the battery portion 260. In some embodiments, the direct charging portion 230 comprises an output control transistor 236 controlling direct charging power output to at least the output portion 270. In some embodiments, the output control transistor 236 comprises a power MOSFET. In some embodiments, gate terminals of one or more of the direct input control transistors 232 and 234, and the output control transistor 236, are coupled to one or more input control logic devices for switch activation and deactivation. The direct charging portions 330, 430 and 530 may correspond to the direct charging portion 230. Further, the direct input control transistors 332, 432 and 532, the direct input control transistors 334, 434 and 534, and the output control transistors 336, 436 and 536 may respectively correspond to the direct input control transistor 232, the direct input control transistor 234, and the output control transistor 236. In some embodiments, the direct charging portions 230 and 430 are respectively coupled to an input node of the charger portion 240 or 440. In alternate embodiments, the direct charging portions 330 and 530 are respectively operatively coupled to an input node of an inductor of the charger portion 340 or 540.

The charging portion 240 may comprise a high-side buck transistor 242, a low-side buck transistor 244, a high-side boost transistor 246, a low-side boost transistor 248, an inductor 250, and an output capacitor 252, for converting input power to output power satisfying one or more predetermined electrical or magnetic parameters. In some embodiments, the charging portion 240 includes an input node coupled to a source terminal of the high-side buck transistor 242. In some embodiments, the charging portion 240 includes an inductor input node coupled to a drain terminal of the high-side buck transistor 242, a source terminal of the low-side buck transistor 244, and an input terminal of the inductor 250. The charging portions 340, 440 and 550 may correspond to the charging portion 220. Further, the high-side buck transistors 342, 442 and 542, the low-side buck transistors 344, 444 and 544, the high-side boost transistor 346, the low-side boost transistor 348, the inductors 350, 450 and 550, and the output capacitors 352, 452 and 552 may respectively correspond to the high-side buck transistor 242, the low-side buck transistor 244, the high-side boost transistor 246, the low-side boost transistor 248, the inductor 250, and the output capacitor 252.

Figure 2A:
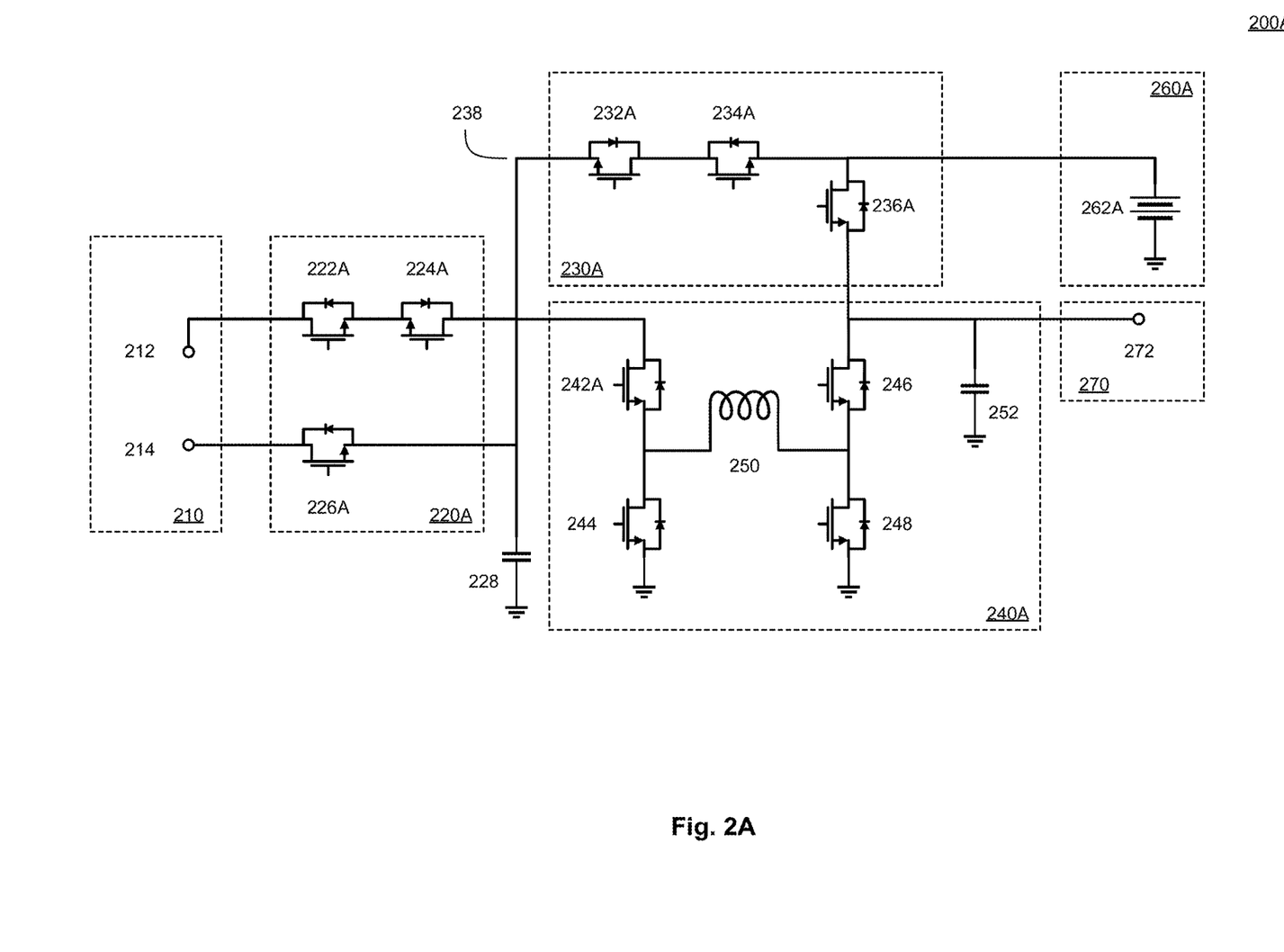
FIG. 2A illustrates an exemplary circuit apparatus including a buck-boost charger and a direct charger coupled to a charger input.

FIG. 2A illustrates an exemplary circuit apparatus including a buck-boost charger and a direct charger coupled to a charger input. As illustrated in FIG. 2A, the exemplary system 200A includes a direct charging path at system node 238. In some embodiments, the system node 238 is coupled to the input controller portion 220A-B at a source terminal of the input controller transistor 224A-B, the charger portion 240A-B at a source terminal of the high-side buck transistor 242A-B, and the direct charging portion 230A-B at a drain terminal of the direct input control transistor 232A-B.

Figure 2B:
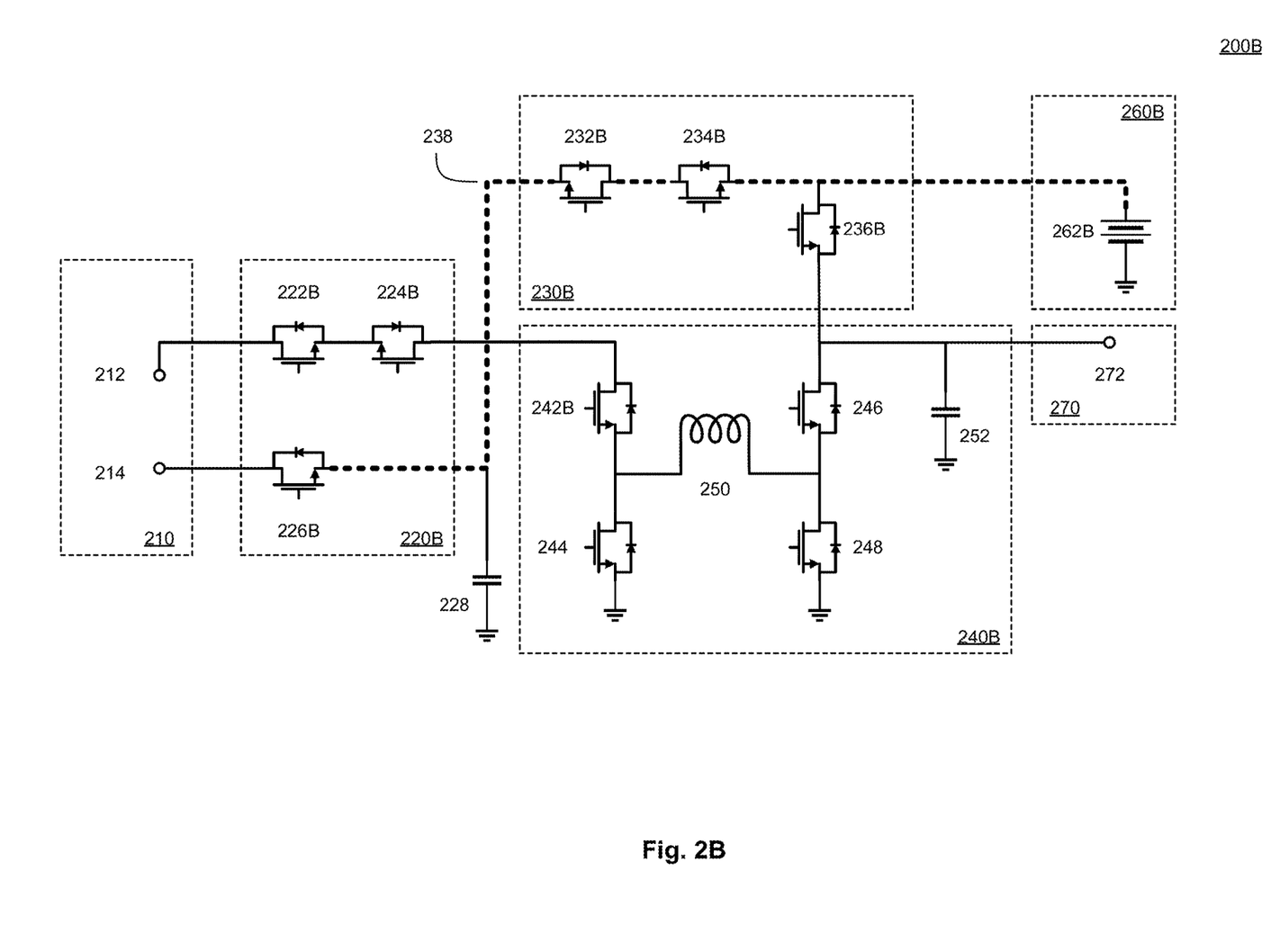
FIG. 2B illustrates the exemplary circuit apparatus of FIG. 2A in a direct charging state.

FIG. 2B illustrates the exemplary circuit apparatus of FIG. 2A in a direct charging state. As illustrated in FIG. 2B, the system 200B in an exemplary direct charging state includes an exemplary direct charging path from the input node 214 to the battery 262B of the battery portion 260B, through system node 238. Further, the exemplary direct charging state of the system 200B isolates the input node 212 and the output node 272 from the direct charging path and the system node 238. In the exemplary direct charging state of the system 200B, the input controller transistor 226B, and the direct input control transistors 232B and 234B are activated. Further, the input controller transistors 222B and 224B, the high-side buck transistor 242B, and the output control transistor 236B are deactivated. In this state, the system 200B operates in a "charging only" mode in which input power is delivered to the battery 262B and isolated from the output node 272. In some embodiments, this charging state allows all input power to be applied to the battery without also being applied to electronics for operating a device including the system 200B. As one example, the system 200B may comprise a mobile electronic device, the battery 262B may comprise a battery of the mobile electronic device, and the output node 272 may be coupled to operating electronics of the mobile electronic device. In some embodiments, the operating electronics may comprise one or more of a mobile device display, an antenna, a processor, a non-transitory memory, and the like as is known or may become known. Thus, the exemplary direct charging state of the system 200B may isolate input power from device displays, antennas, processors, memories, and the like to prioritize rapid charging of a device battery.

In some embodiments, the system 200B may operate with various combinations of activation of the input nodes 212 and 214, the battery 262B, and the output node 272. In some embodiments, a further exemplary direct charging state of the system 200B may operate in a charging mode in which input power is concurrently delivered to the battery 262B and the output node 272. In some embodiments, the system 200B may allow operating electronics coupled to the output node 272 to operate in a fully powered or a reduced power mode, while concurrently charging the battery 262B. In this exemplary state, the output control transistor may be activated. In some embodiments, a still further exemplary direct charging state of the system 200B may receive input power from the input node 212 concurrently with or instead of receiving input power from input node 214. As one example, the system 200B may receive input power only from input node 212, by activating the input controller transistors 222B and 224B and deactivating the input controller transistor 226B. As another example, the system 200B may receive input power concurrently from input nodes 212 and 214, by activating the input controller transistors 222B, 224B and 226B. It is to be understood that the present embodiments are not limited to the exemplary number or types of input node and input controller transistors, and may include an arbitrary number and type of input nodes and input controller transistors as are known or may become known.

Figure 3A:
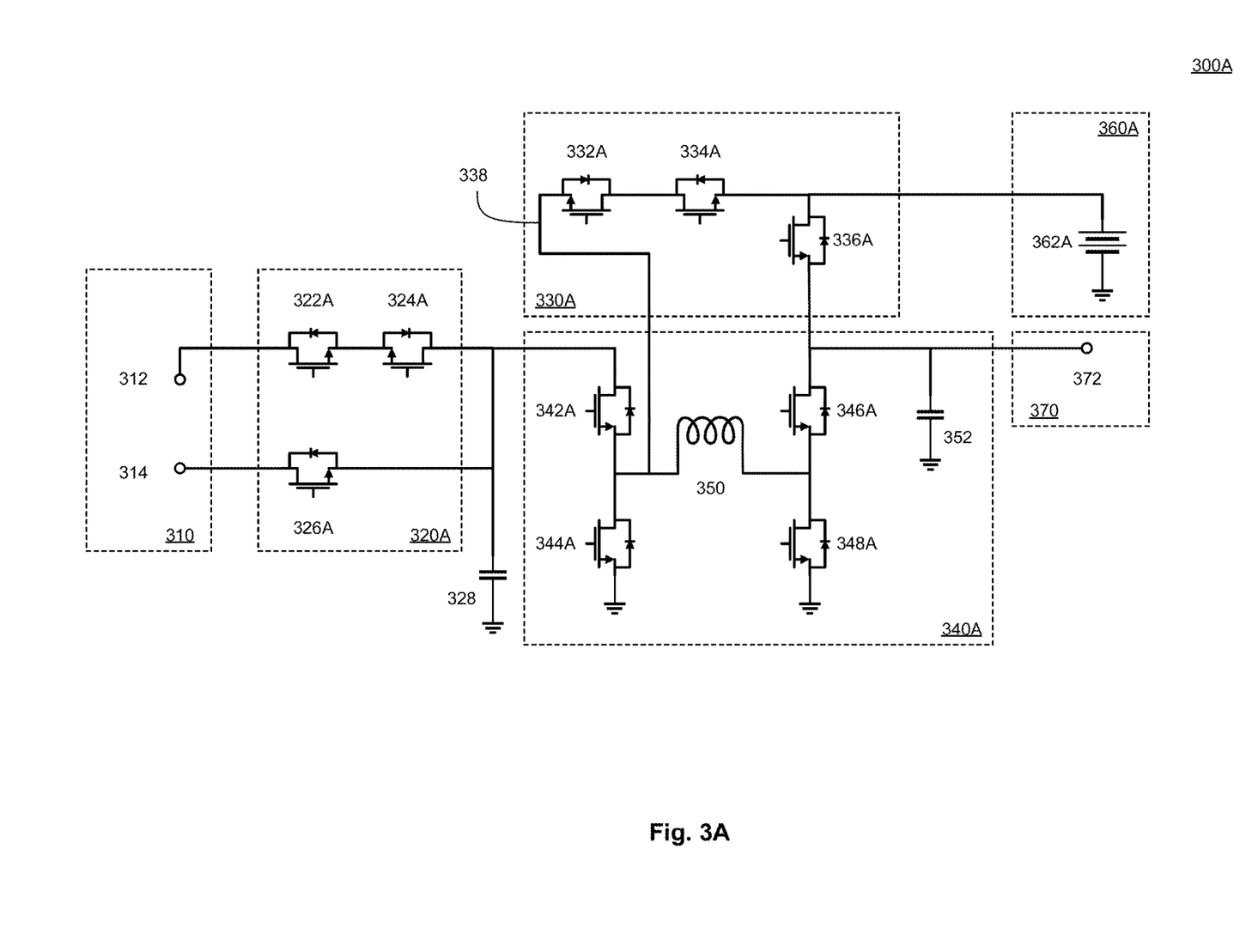
FIG. 3A illustrates an exemplary circuit apparatus including a buck-boost charger and a direct charger coupled to an inductor input.

FIG. 3A illustrates an exemplary circuit apparatus including a buck-boost charger and a direct charger coupled to an inductor input. As illustrated in FIG. 3A, the exemplary system 300A includes a direct charging path at system node 338. In some embodiments, the system node 338 is coupled to the charger portion 240A-B at a drain terminal of the high-side buck transistor 242A-B and an input terminal of the inductor 250, and the direct charging portion 230A-B at a drain terminal of the direct input control transistor 232A-B.

Figure 3B:
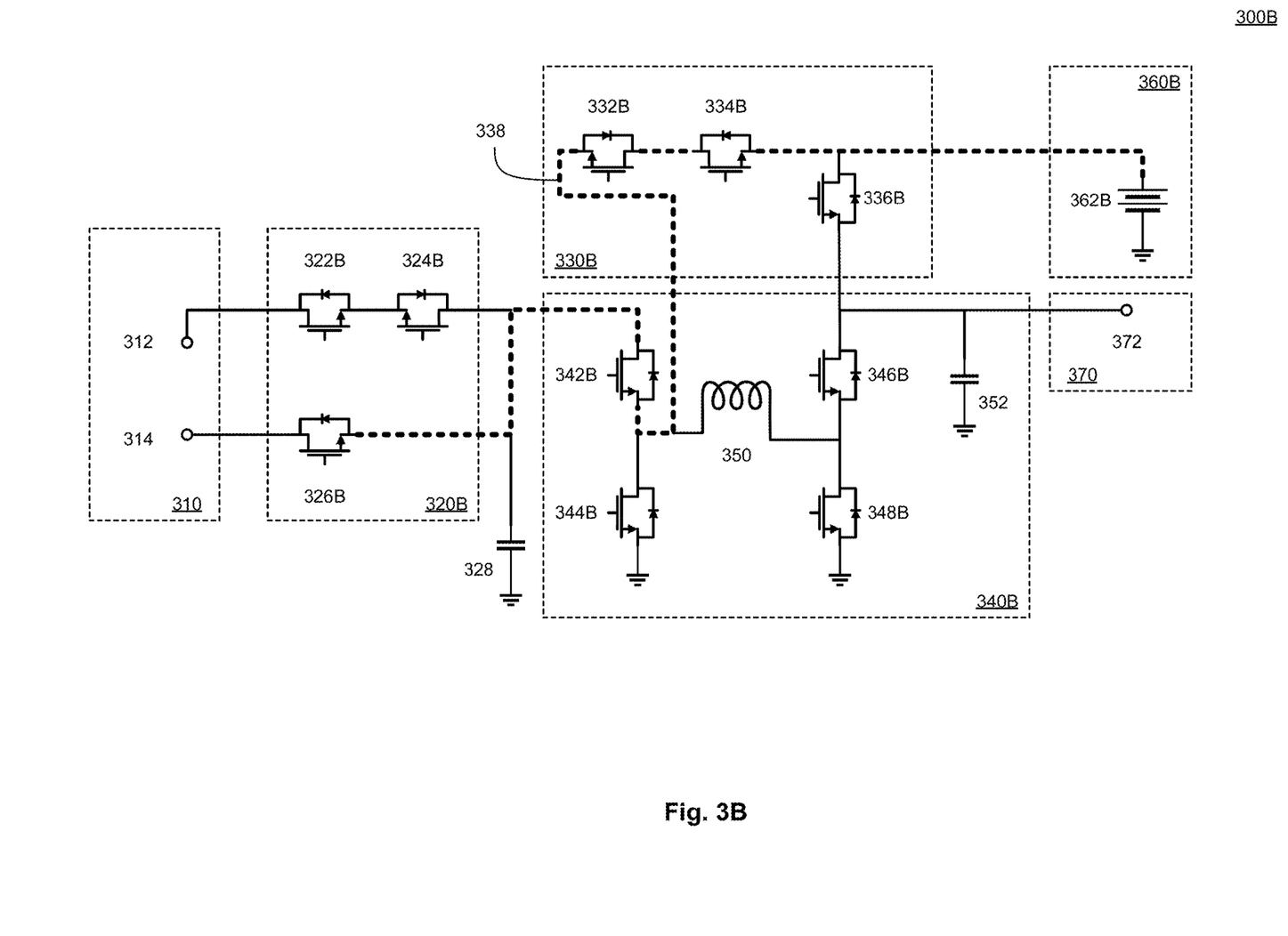
FIG. 3B illustrates the exemplary circuit apparatus of FIG. 3A in a direct charging state.

FIG. 3B illustrates the exemplary circuit apparatus of FIG. 3A in a direct charging state. As illustrated in FIG. 3B, the system 300B in an exemplary direct charging state includes an exemplary direct charging path from the input node 314 to the battery 362B of the battery portion 360B, through system node 338. Further, the exemplary direct charging state of the system 300B isolates the input node 312 and the output node 372 from the direct charging path and the system node 338. In the exemplary direct charging state of the system 300B, the input controller transistor 326B, the high-side buck transistor 342B, and the direct input control transistors 232B and 234B are activated. Further, the input controller transistors 222B and 224B, the high-side boost transistor 346B, and the output control transistor 336B are deactivated. It is to be understood that the system 300B is also operable at least in any direct charging state in which the system 200B is operable.

Figure 4A:
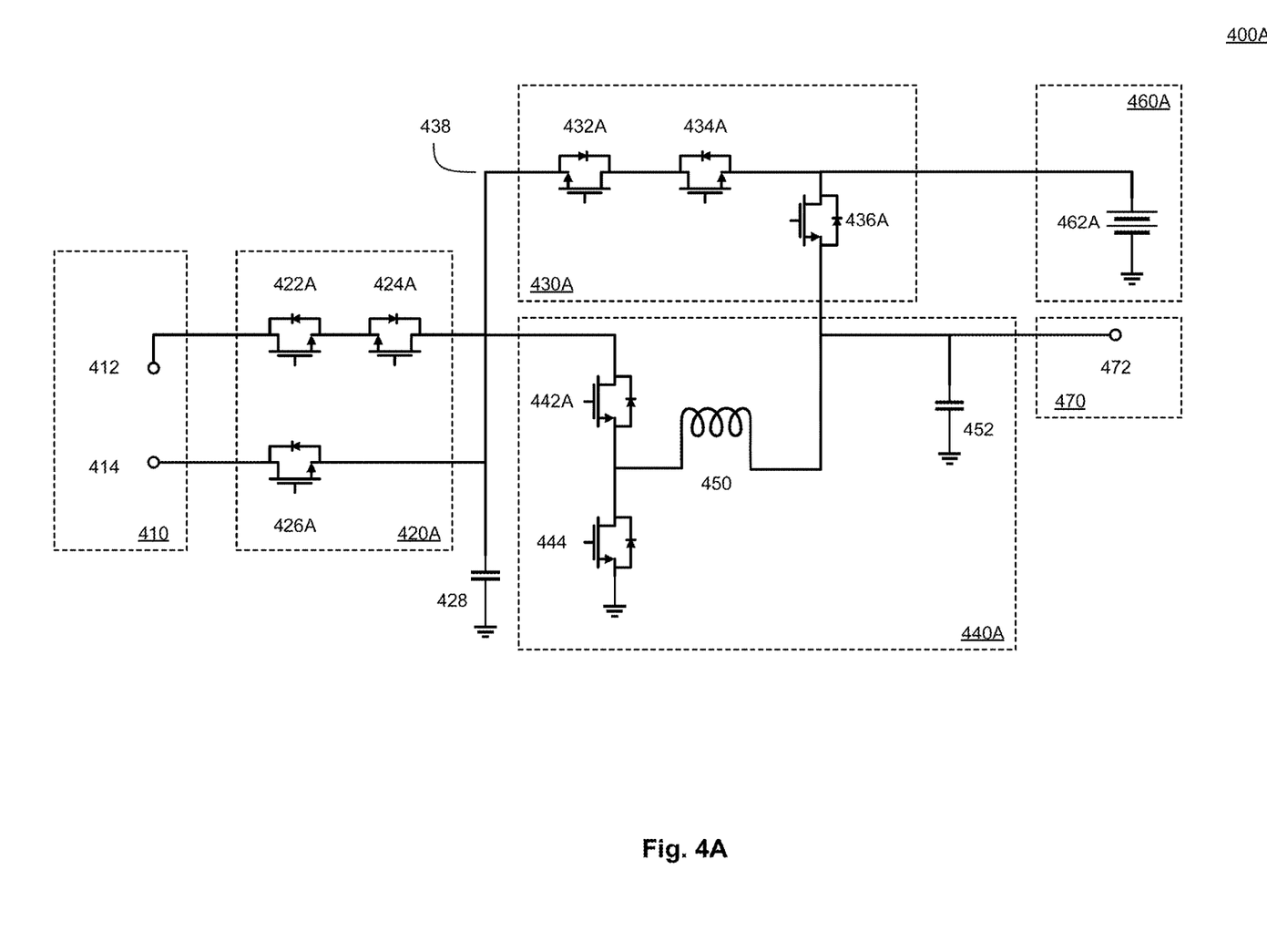
FIG. 4A illustrates an exemplary circuit apparatus including a buck charger and a direct charger coupled to a charger input.

FIG. 4A illustrates an exemplary circuit apparatus including a buck charger and a direct charger coupled to a charger input. As illustrated in FIG. 4A, the exemplary system 400A includes a direct charging path at system node 438. In some embodiments, the system node 438 is coupled to the input controller portion 420A-B at a source terminal of the input controller transistor 424A-B, the charger portion 440A-B at a source terminal of the high-side buck transistor 242A-B, and the direct charging portion 230A-B at a drain terminal of the direct input control transistor 232A-B.

Figure 4B:
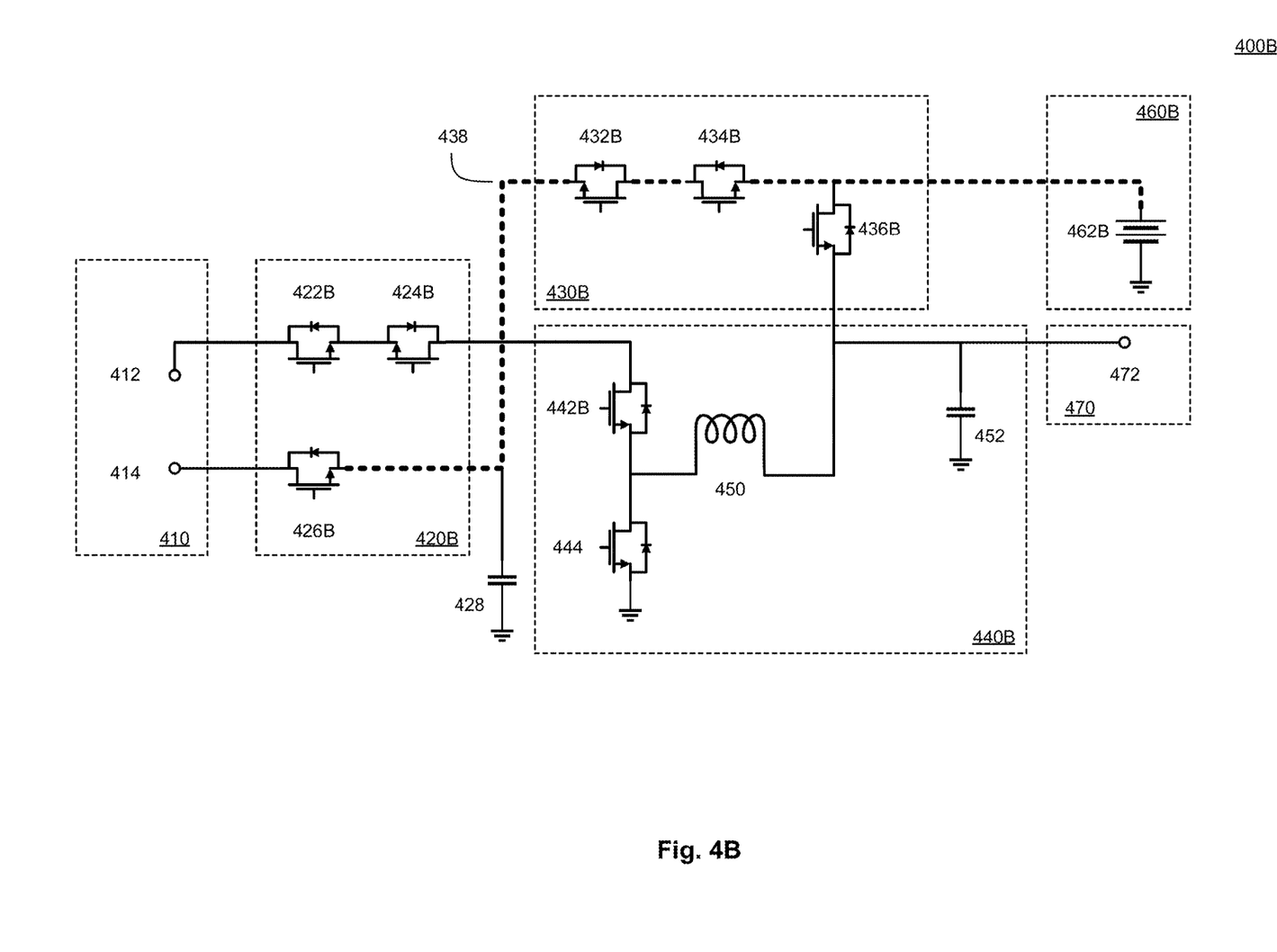
FIG. 4B illustrates the exemplary circuit apparatus of FIG. 4A in a direct charging state.

FIG. 4B illustrates the exemplary circuit apparatus of FIG. 4A in a direct charging state. As illustrated in FIG. 4B, the system 400B in an exemplary direct charging state includes an exemplary direct charging path from the input node 414 to the battery 462B of the battery portion 460B, through system node 438. Further, the exemplary direct charging state of the system 400B isolates the input node 412 and the output node 472 from the direct charging path and the system node 438. In the exemplary direct charging state of the system 400B, the input controller transistor 426B, and the direct input control transistors 432B and 434B are activated. Further, the input controller transistors 422B and 424B, the high-side buck transistor 442B, and the output control transistor 436B are deactivated. It is to be understood that the system 400B is also operable at least in any direct charging state in which the system 200B is operable.

Figure 5A:
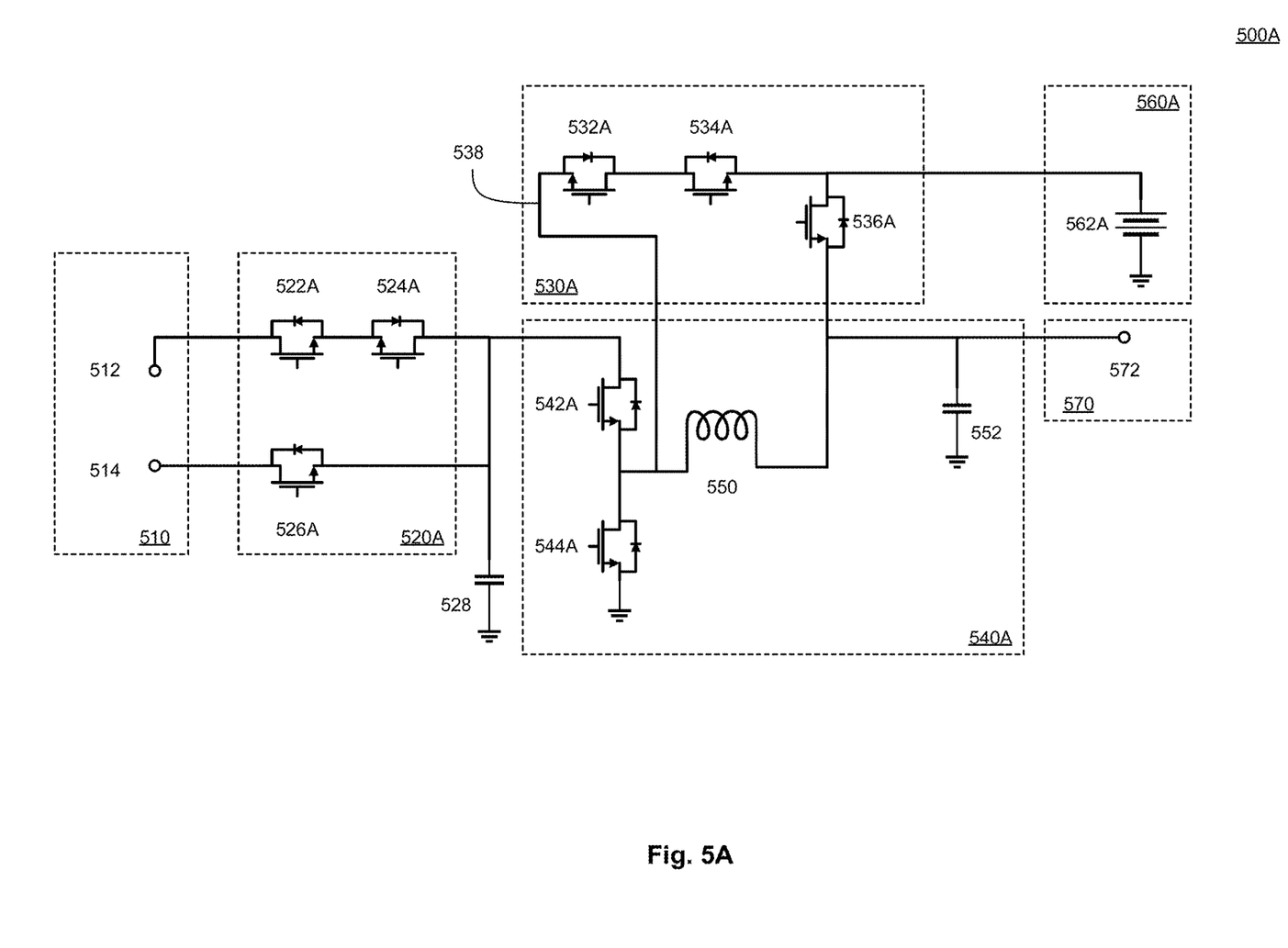
FIG. 5A illustrates an exemplary circuit apparatus including a buck charger and a direct charger coupled to a charger input.

FIG. 5A illustrates an exemplary circuit apparatus including a buck charger and a direct charger coupled to an inductor input.

Figure 5B:
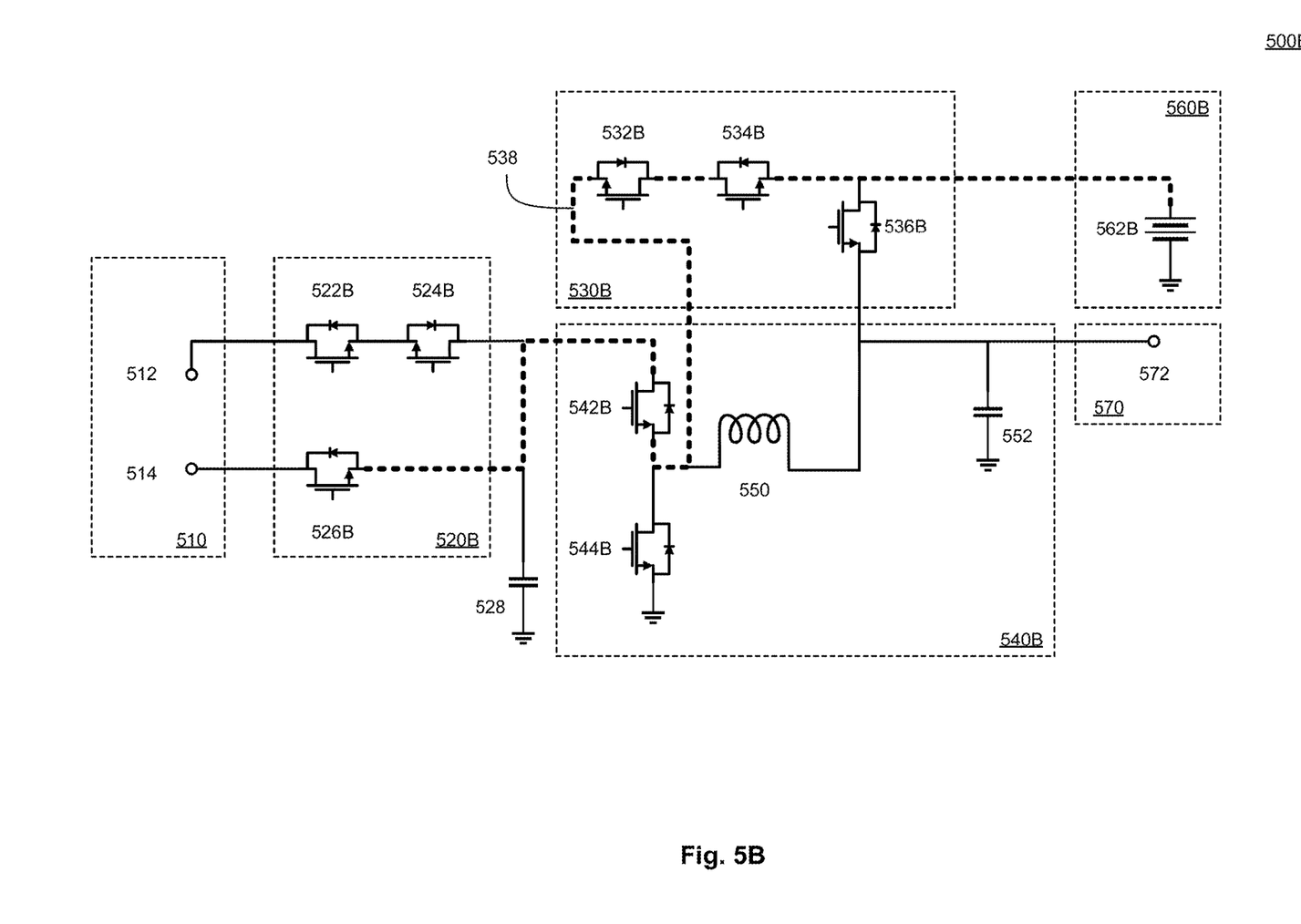
FIG. 5B illustrates the exemplary circuit apparatus of FIG. 4A in a direct charging state.

FIG. 5B illustrates the exemplary circuit apparatus of FIG. 4A in a direct charging state. As illustrated in FIG. 5B, the system 500B in an exemplary direct charging state includes an exemplary direct charging path from the input node 514 to the battery 562B of the battery portion 560B, through system node 538. Further, the exemplary direct charging state of the system 500B isolates the input node 512 from the direct charging path and the system node 538. In the exemplary direct charging state of the system 500B, the input controller transistor 526B, the high-side buck transistor 542B, and the direct input control transistors 532B and 534B are activated. Further, the input controller transistors 522B and 524B, and the output control transistor 536B are deactivated. In some embodiments, the exemplary direct charging state of the system 500B may operate in a charging mode in which input power is concurrently delivered to the battery 562B and the output node 572. In some embodiments, the system 500B may allow operating electronics coupled to the output node 572 to operate in a fully powered or a reduced power mode, while concurrently charging the battery 5262B. In this exemplary state, the output control transistor may be activated. In some embodiments, the system 500B may operate with various combinations of activation of the input nodes 512 and 514. In some embodiments, a further exemplary direct charging state of the system 500B may receive input power from the input node 512 concurrently with or instead of receiving input power from input node 514, in accordance with the operation of system 200B.

Figure 6:
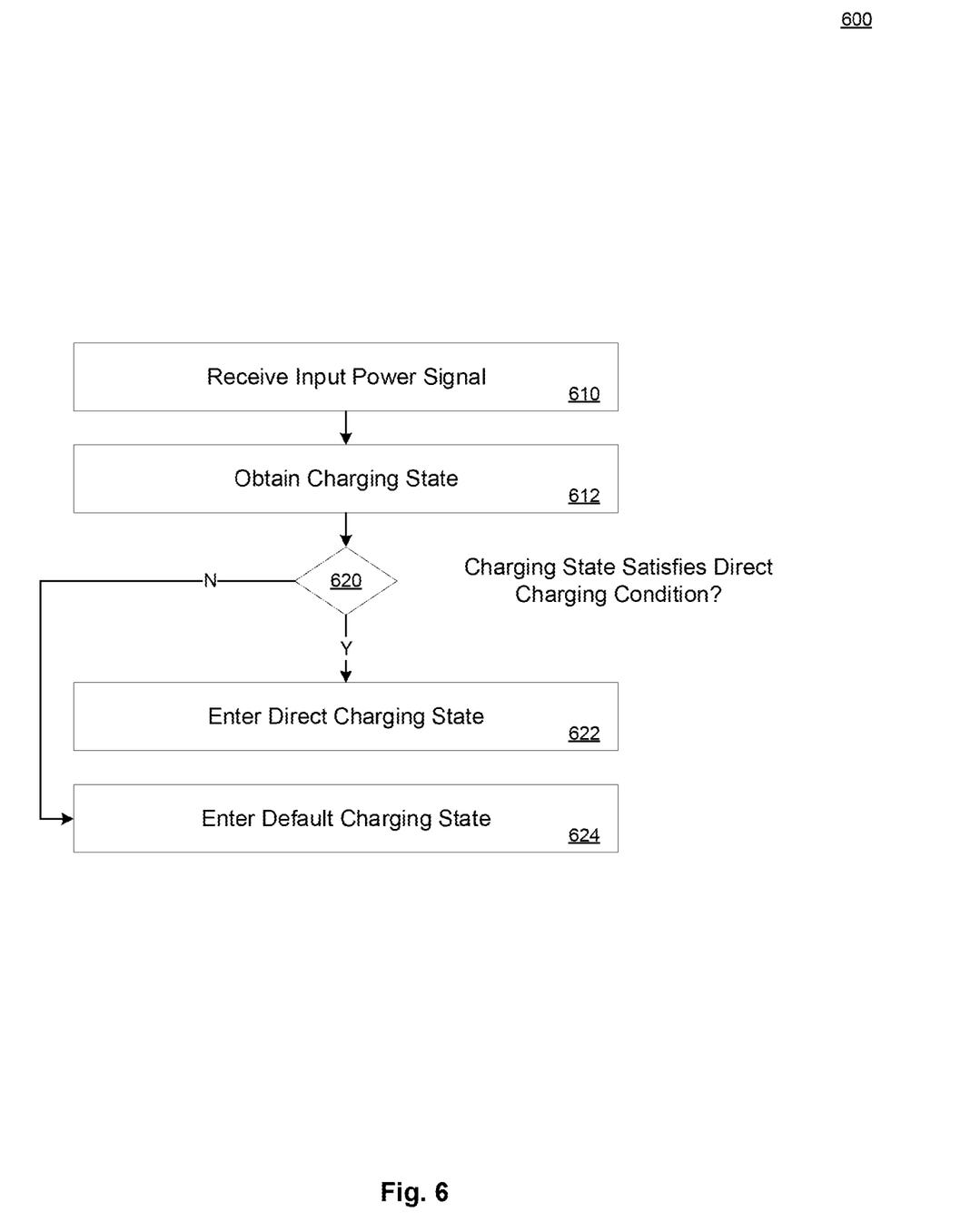
FIG. 6 illustrates an exemplary method of charging including a direct charging state, in accordance with present embodiments.

FIG. 6 illustrates an exemplary method of charging including a direct charging state, in accordance with present embodiments. In some embodiments, one of the exemplary systems 100-500 performs method 600 according to present embodiments.

At step 610, the exemplary system receives an input power signal. In some embodiments, the input power signal comprises a voltage, current, inductance, capacitance, flux, or the like. In some embodiments, the input power signal is received at one or more of the input nodes 212, 214, 312, 314, 412, 414, 512 and 514. The method 600 then continues to step 612.

At step 612, the exemplary system obtains a charging state. In some embodiments, the exemplary system obtains the charging state from an instruction received from at least one state control logic device controlling one or more transistors of the exemplary system in accordance with present embodiments. In some embodiments, the state control logic device includes at least one processor operable to determine, select, or identify a charging state based on one or more characteristics of the exemplary system. In some embodiments, the exemplary system obtains the charging state from one or more instructions received from a user or a user device. In some embodiments, the exemplary system obtains the charging state from a device or system associated with a device or system coupled to the exemplary system at the output node 272, 372, 472 or 572, or from device or system associated with a device or system coupled to the exemplary system at one or more of the input nodes 212, 214, 312, 314, 412, 414, 512 and 514. The method then continues to step 620.

At step 620, the exemplary system detects whether the obtained charging state satisfies a direct charging condition. In some embodiments, the direct charging condition includes a configuration of transistors in a particular combination of activated and deactivated states to support a direct charging path from the input 102 to at least one of the battery 106 and the load 110. In some embodiments, the direct charging condition comprises a logical or electrical threshold for a logical or electrical parameter that may allow or disallow activation or deactivation of one or more transistors of the exemplary embodiments. As one example, a logical parameter includes a binary flag for indicating a direct charging state of an electronic device, and a logical threshold for a logical parameter includes a selection of direct charging to a 'true' state by a user or an electronic device. Here, a user may select that an electronic device enter a direct charging mode for any reason, or a device may select a direct charging mode for "fast" charging, if an electronic device is capable of direct charging and conditions of the electronic device meet an automatic direct charging threshold. As another example, an electrical parameter includes a voltage, current, or like level of a battery of an electronic device, and an electrical threshold for a logical parameter includes a trigger for direct charging based on an automatic direct charging threshold associated with the electrical parameter. As one example, an automatic direct charging threshold may include a battery power level falling below a threshold voltage, current, or like electrical characteristic. If the exemplary system detects that the obtained charging state satisfies the direct charging condition, the method 600 continues to step 622. Alternatively, if the exemplary system does not detect that the obtained charging state satisfies the direct charging condition, or detects that the obtained charging state does not satisfy the direct charging condition, the method 600 continues to step 624.

At step 622, the exemplary system enters a direct charging state. In some embodiments, the exemplary system supplies unconverted power from the input 102 to at least the battery 106 through the input controller 104 and the direct charger 108. In an exemplary direct charging state, input power flows directly to the battery 106 without being converted through the charger 112. Thus, the exemplary system may charge the battery 106 with power directly from the input 102, without potential power and efficiency losses associated with supplying power through the charger 112.

At step 624, the exemplary system enters a default charging state. In some embodiments, the exemplary system supplies converted power from the input 102 to at least one of the battery 106 and the load 110 through the input controller 104 and the charger 112. In an exemplary default charging state, input power flows to at least one of the battery 106 and the load 110 after being converted through the charger 112. Thus, the exemplary system may charge the battery with power converted from the input 102 through the charger 112 to support input power having various and varying input power characteristics not necessarily directly compatible with at least one of the battery 106 and the load 110.

Figure 7:
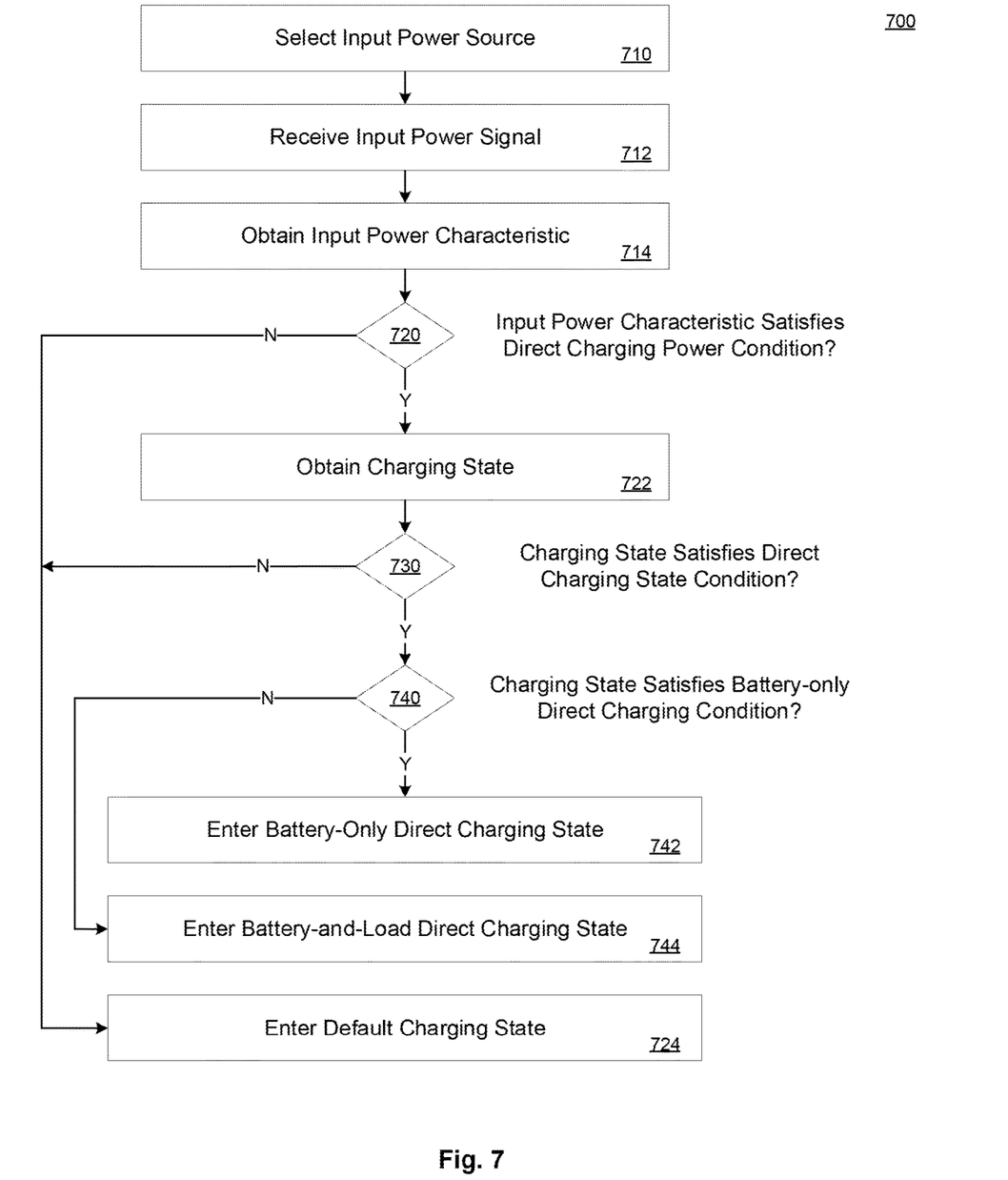
FIG. 7 illustrates an exemplary method of charging including a plurality of direct charging states, in accordance with present embodiments.

FIG. 7 illustrates an exemplary method of charging including a plurality of direct charging states, in accordance with present embodiments. In some embodiments, one of the exemplary systems 100-500 performs method 700 according to present embodiments.

At step 710, an exemplary system selects an input power source. In some embodiments, the exemplary system may select an input power source from a plurality of available power sources. In some embodiments, available power sources include one or more devices supplying power to one or more of the input terminals 212, 214, 312, 314, 412, 414, 512 and 514. In some embodiments, power sources are connected to one or more of the input terminals 212, 214, 312, 314, 412, 414, 512 and 514 by a USB-C, USB-PD, or like cable operatively coupled to a compatible USB-C, USB-PD or like input terminal including the input 102 and the input controller 104. In some embodiments, the selecting includes selecting in put terminal with sufficient power delivery capabilities or power characteristics likely to be compatible with power delivery. In some embodiments, the selecting includes selecting a plurality of input power sources. As one example, an electronic device may select all USB-C or USB-PD terminals operatively coupled to power supplies compatible with USB-C, USB-PD or the like, through various cables to external or separable devices. The method 700 then continues to step 712.

At step 712, the exemplary system receives an input power signal. In some embodiments, the system receives an input signal in accordance with step 610. The method 700 then continues to step 714.

At step 714, the exemplary system obtains at least one input power characteristic. In some embodiments, the at least one input characteristic includes at least one measured voltage, current, inductance, capacitance, flux or the like compatible with USB-C or USB-PD. As one example, an exemplary system may measure current and voltage associated with the received input power signal. The method 700 then continues to step 720.

At step 720, the exemplary system detects whether the obtained input power characteristic satisfies a direct charging power condition. In some embodiments, the direct charging power condition comprises a logical or electrical threshold for a logical or electrical parameter that may allow or disallow activation or deactivation of one or more transistors of the exemplary embodiments. As one example, a logical parameter includes a binary flag for indicating compatibility of input power with direct charging of an electronic device, and a logical threshold for a logical parameter includes at least one of a minimum or maximum voltage or current defining a power input compatible with direct charging by an electronic device. If the exemplary system detects that the obtained input power characteristic satisfies the direct charging power condition, the method 700 continues to step 722. Alternatively, if the exemplary system does not detect that the obtained input power characteristic satisfies the direct charging power condition, or detects that the obtained input power characteristic does not satisfy the direct charging power condition, the method 700 continues to step 724.

At step 722, the exemplary system obtains a charging state. In some embodiments, the system obtains a charging state in accordance with step 612. The method then continues to step 730.

At step 730, the exemplary system detects whether the obtained charging state satisfies a direct charging state condition. In some embodiments, the system detects whether the obtained charging state satisfies a direct charging state condition in accordance with step 620. If the exemplary system detects that the obtained charging state satisfies the direct charging state condition, the method 700 continues to step 740. Alternatively, if the exemplary system does not detect that the obtained charging state satisfies the direct charging state condition, or detects that the obtained charging state does not satisfy the direct charging state condition, the method 700 continues to step 724.

At step 740, the exemplary system detects whether the obtained charging state satisfies a battery-only direct charging condition. In some embodiments, the battery-only direct charging condition includes a configuration of transistors in a particular combination of activated and deactivated states to support a direct charging path from the input 102 to the battery 106 while electrically isolating the load 110. In some embodiments, the battery-only direct charging condition comprises a logical or electrical threshold for a logical or electrical parameter that may allow or disallow activation or deactivation of one or more transistors of the exemplary embodiments. As one example, a logical parameter includes a binary flag for indicating a battery-only direct charging state of an electronic device, and a logical threshold for a logical parameter includes a selection of battery-only direct charging to a 'true' state by a user or an electronic device. Here, a user may select that an electronic device enter a battery-only direct charging mode for any reason, or a device may select a battery-only direct charging mode for "fast" charging, if an electronic device is capable of direct charging and conditions of the electronic device meet an automatic battery-only direct charging threshold. In some embodiments, a battery-only direct charging threshold may include a power level tier of a battery (e.g., high, medium, low or critical) of an electronic device in accordance with present embodiments.

As another example, an electrical parameter includes a voltage, current, or like level of a battery of an electronic device, and an electrical threshold for a logical parameter includes a trigger for battery-only direct charging based on an automatic battery-only direct charging threshold associated with the electrical parameter. As one example, an automatic battery-only direct charging threshold may include a battery power level falling below a threshold voltage, current, or like electrical characteristic. If the exemplary system detects that the obtained charging state satisfies the battery-only direct charging condition, the method 700 continues to step 742. Alternatively, if the exemplary system does not detect that the obtained charging state satisfies the battery-only direct charging condition, or detects that the obtained charging state does not satisfy the battery-only direct charging condition, the method 700 continues to step 744.

At step 742, the exemplary system enters a battery-only direct charging state. In some embodiments, the exemplary system supplies unconverted power from the input 102 to the battery 106 through the input controller 104 and the direct charger 108, while electrically isolating the load 110. In an exemplary battery-only direct charging state, input power flows directly to the battery 106 without being converted through the charger 112. Thus, the exemplary system may charge the battery 106 with dedicated power directly from the input 102, without potential power and efficiency losses associated with supplying power through the charger 112.

At step 744, the exemplary system enters a battery-and-load direct charging state. In some embodiments, the exemplary system supplies unconverted power from the input 102 to the battery 106 and the load 110 through the input controller 104 and the direct charger 108. In an exemplary battery-and-load direct charging state, input power flows directly to the battery 106 and the load 110 without being converted through the charger 112. Thus, the exemplary system may charge the battery 106 and supply system power to the load 110 with power directly from the input 102, and without potential power and efficiency losses associated with supplying power through the charger 112.

At step 724, the exemplary system enters a default charging state. In some embodiments, the system enters a default charging state in accordance with step 624.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A device comprising:
an inductive charger circuit having an input node, an output node, a buck transistor operatively coupled with the input node and a first charger node, and an inductor coupled to the first charger node, the buck transistor having a buck body diode with a cathode terminal coupled to the input node and an anode terminal coupled to the first charger node; and
a direct charger circuit having a first transistor operatively coupled with the inductive charger at the first charger node of the inductive charger, and having a second transistor coupled with the first transistor at a common node and coupled with a battery component, the first transistor having a first body diode with a cathode terminal coupled to the common node and an anode terminal coupled to the first charger node of the inductive charger, and the second transistor having a second body diode with a cathode terminal coupled to the common node and an anode terminal coupled to the battery component.

2. The device of claim 1, wherein the input node and the first charger node are operatively coupled to an output node of a power source at a first device node.

3. The device of claim 2, further comprising:
a first input controller transistor having a first body diode; and
a second input controller transistor having a second body diode, coupled with the first input controller transistor at a second common node, and coupled with the first charger node.

4. The device of claim 1, wherein the input node is operatively coupled with an output node of an input controller transistor and with the first transistor at a first device node.

5. The device of claim 1, wherein the second transistor is operatively coupled with the battery component at a second device node.

6. The device of claim 5, wherein the direct charger circuit is operatively coupled at a third device node to the output node of the inductive charger circuit.

7. The device of claim 6, wherein the direct charger circuit comprises a bypass output switch operatively coupling the second device node with the third device node.

8. The device of claim 7, wherein the bypass output switch comprises a power MOSFET.

9. The device of claim 1, wherein the inductive charger circuit comprises at least one of a buck charger and a buck-boost charger.

10. A system comprising:
an inductive charger circuit having an input node, an output node, a buck transistor operatively coupled with the input node and a first charger node and an inductor coupled to the first charger node, the buck transistor having a buck body diode with a cathode terminal operatively coupled to the input node and an anode terminal of the buck body diode operatively coupled to the first charger node; and
a direct charger circuit having a first transistor operatively coupled with the input node of the inductive charger at the first charger node of the inductive charger, and having a second transistor coupled with the first transistor at a common node and with a battery component, the first transistor having a first body diode with a cathode terminal operatively coupled to the common node and an anode terminal operatively coupled to the first charger node of the inductive charger, and the second transistor having a second body diode with a cathode terminal operatively coupled to the common node and an anode terminal coupled to the battery component.

\* \* \* \* \*